(12) United States Patent
Hou et al.

(10) Patent No.: US 9,766,725 B2
(45) Date of Patent: Sep. 19, 2017

(54) FORCE SENSING MODULE

(71) Applicant: UNEO Inc., Taipei (TW)

(72) Inventors: Chih-Sheng Hou, Taipei (TW);
Chia-Hung Chou, Taipei (TW)

(73) Assignee: UNEO Inc., Taipei (TW)

( * ) Notice: Subject to any disclaimer, the term of this patent is extended or adjusted under 35 U.S.C. 154(b) by 58 days.

(21) Appl. No.: 14/693,567

(22) Filed: Apr. 22, 2015

(65) Prior Publication Data

US 2016/0313839 A1   Oct. 27, 2016

(51) Int. Cl.
  *G06F 3/0354* (2013.01)
(52) U.S. Cl.
  CPC .................. *G06F 3/03545* (2013.01)
(58) Field of Classification Search
  CPC . G06F 3/0414; G06F 3/03545; G01L 5/0014; G01L 5/165
  See application file for complete search history.

(56) References Cited

U.S. PATENT DOCUMENTS

| | | | | |
|---|---|---|---|---|
| 7,202,862 B1* | 4/2007 | Palay | .................. | G06F 3/03545 178/18.01 |
| 2001/0047689 A1* | 12/2001 | McIntosh | .............. | B81B 3/0086 73/514.32 |
| 2006/0027031 A1* | 2/2006 | Ealey | ...................... | G01D 5/25 73/862.041 |

* cited by examiner

*Primary Examiner* — Liliana Cerullo
(74) *Attorney, Agent, or Firm* — Hauptman Ham, LLP

(57) ABSTRACT

A force sensing module is disclosed. One of the embodiments disclosed a first force sensor, and a second force sensor stacked on a top surface of the first force sensor; a signal processing circuit electrically coupled to the first signal force sensor and the second force sensor; when a force is applied on a top surface of the stack, a corresponding force signal is generated; wherein a strength of the force signal is related to an amount of the force applied against the stack.

46 Claims, 17 Drawing Sheets

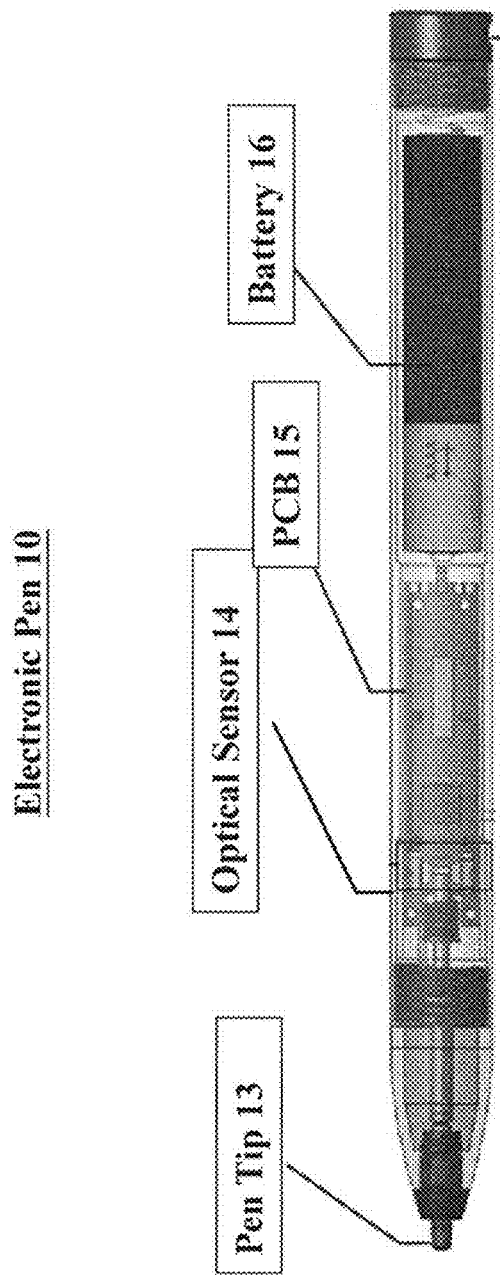

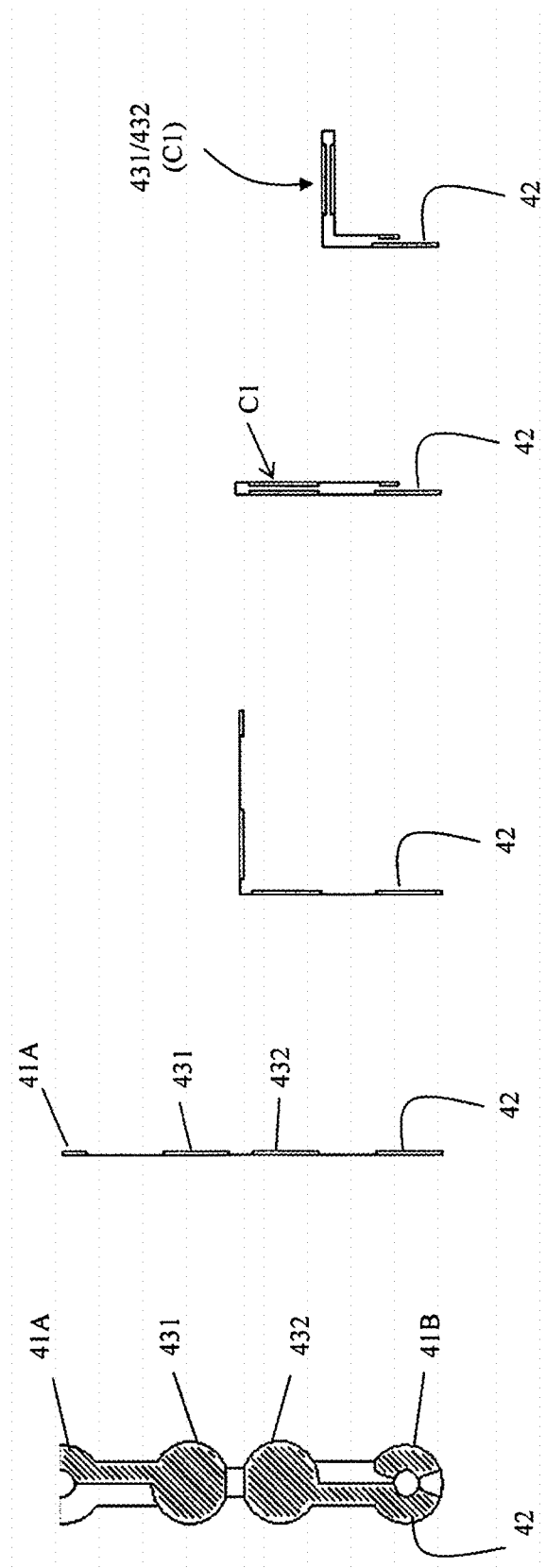

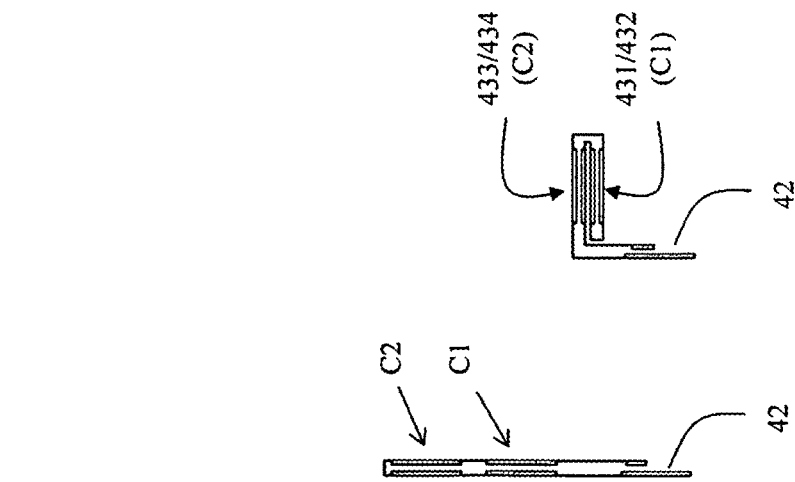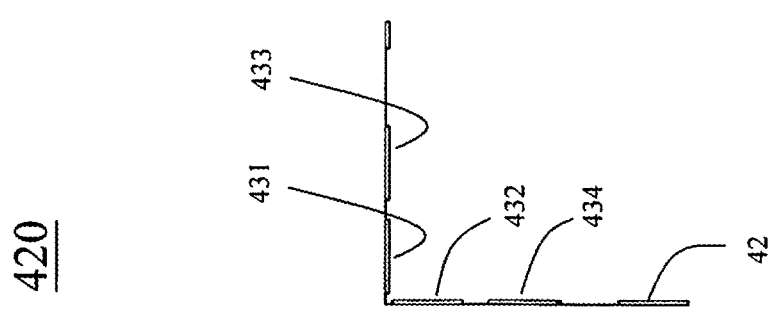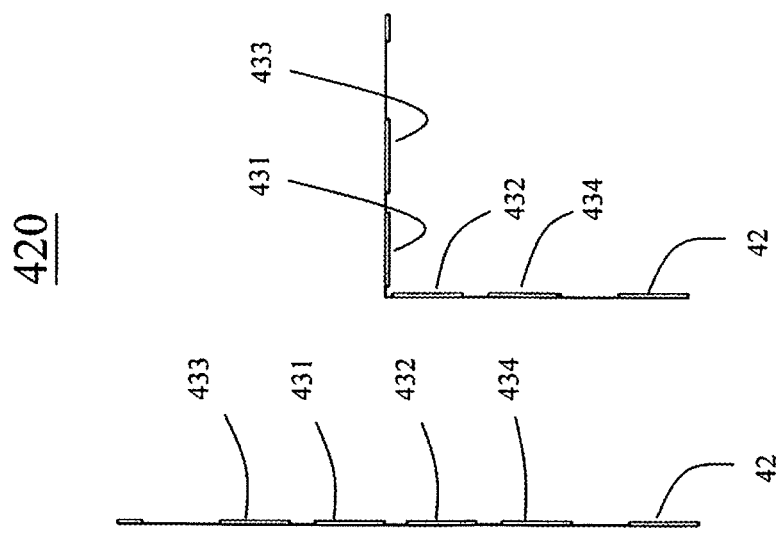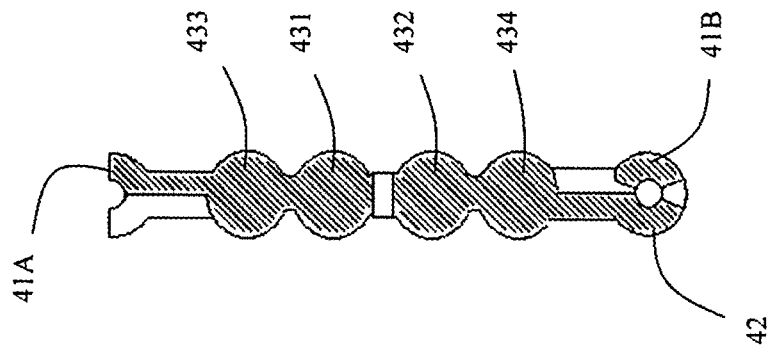

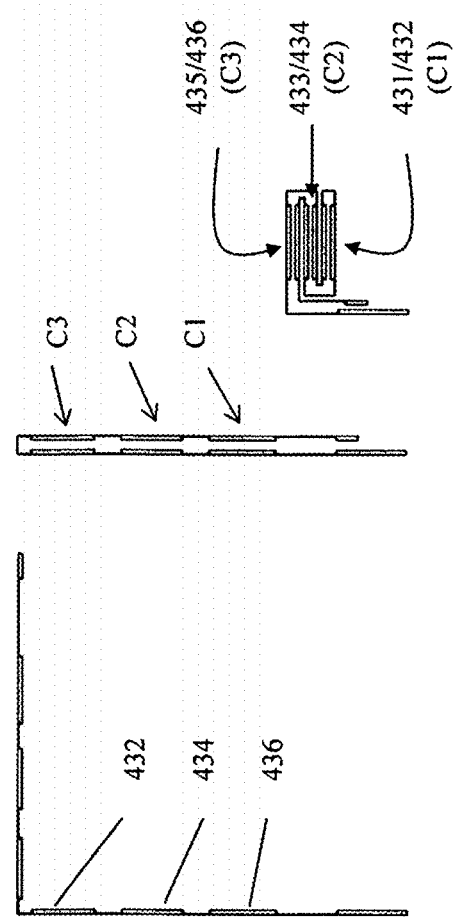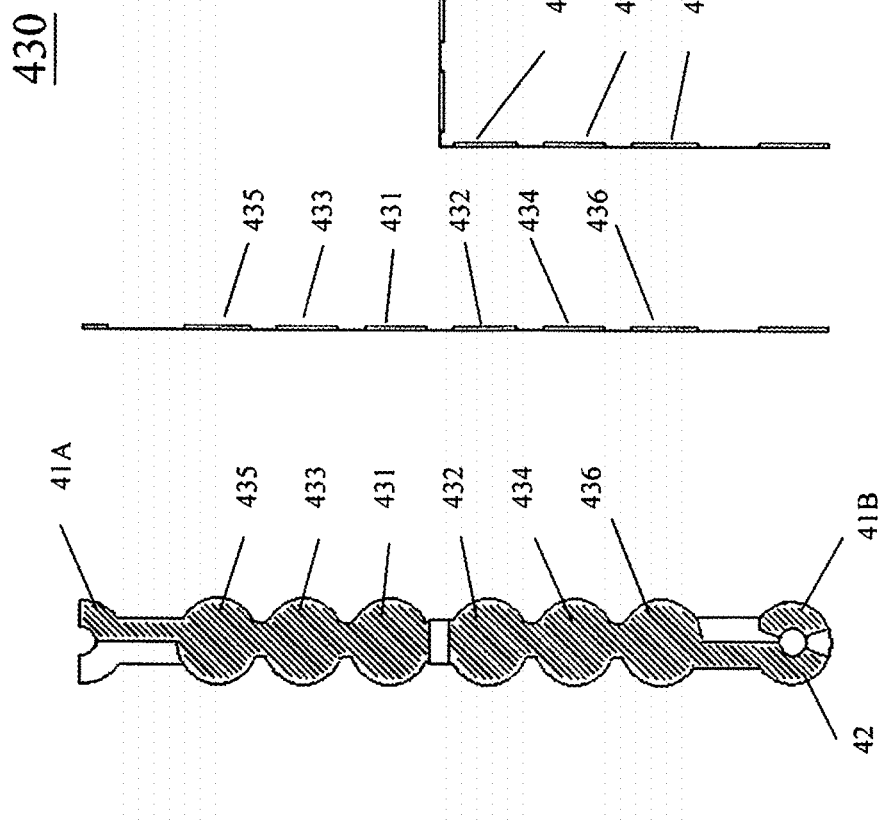

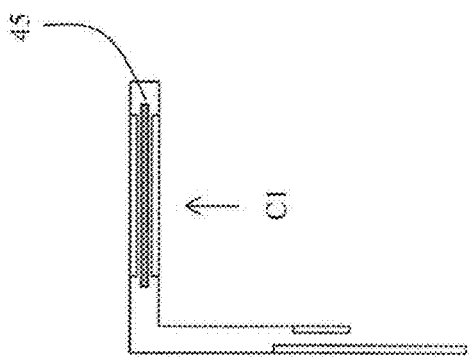
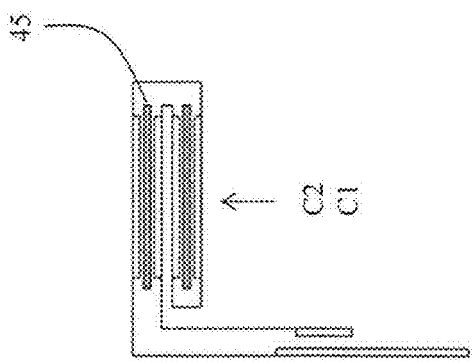
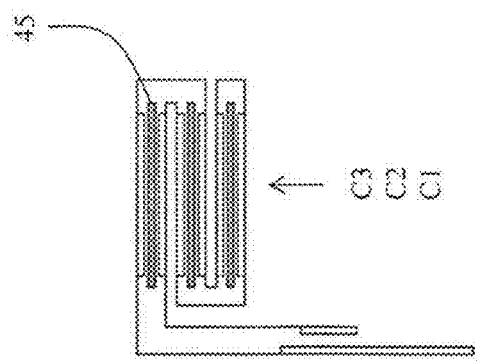

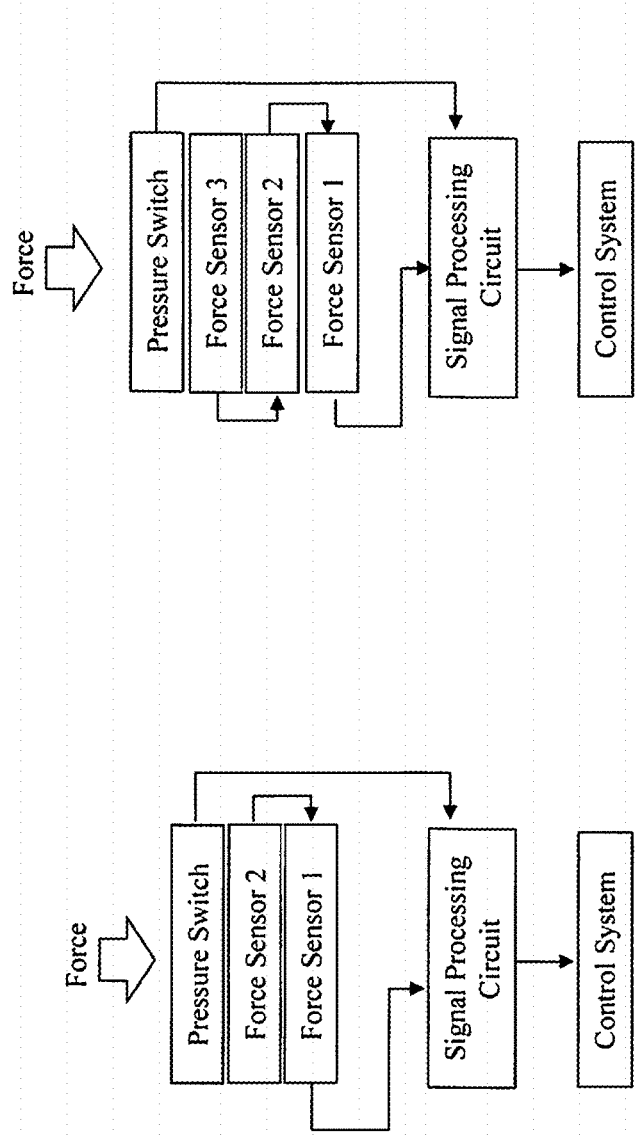

FORCE SENSING MODULE

BACKGROUND

Technical Field

The present invention relates to a force sensing module, especially related to a force sensor adaptive to be used in an electronic pen or other electronic devices.

Description of Related Art

FIG. 1 shows a prior art electronic pen.

FIG. 1 shows an electronic pen 10 which includes a pen tip 13 and an optical sensor. The optical sensor 14 is configured on a bottom of the pen tip 13 for sensing a pressure applied against the pen tip 13. A printed circuit board 15 is configured on a bottom of the optical sensor 14 for processing the signal information sensed at the optical sensor 14 and then transmits a corresponding signal to a display. A battery 16 is configured on a bottom of the printed circuit board 15 to provide energy for powering the electronic pen 10.

The disadvantage for the prior art is that the complicated system uses optical sensor 14 which is always active. In order to save battery power, a more energy efficient pressure sensing mechanism producing larger signal change in a compact form factor is desired. This could be achieved using a combination of force sensors and force sensitive switches in a single electronic pen device

BRIEF DESCRIPTION OF THE DRAWINGS

FIG. 1 shows a prior art electronic pen.
FIGS. 2A~2E show a first flexible circuit board based capacitor according to the present invention.
FIGS. 3A~3E show a second flexible circuit board based capacitor according to the present invention.
FIGS. 4A~4E show a third flexible circuit board based capacitor according to the present invention.
FIGS. 5A~5C show a first embodiment of force sensing module according to the present invention.
FIGS. 11A~11B show modified block diagrams to FIGS. 10B~10C respectively.
FIGS. 17A~47B shows a modified version of the pressure switch according to the present invention.

DETAILED DESCRIPTION OF THE INVENTION

Figure 6A:
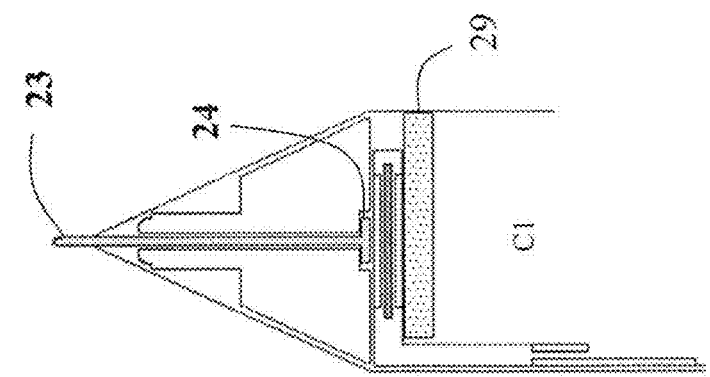
FIGS. 6A~6C show an electronic pen using the force sensing module according to the present invention.

The present invention discloses a force sensing module. More force sensors can be stacked for increasing measurable signal range of a force applied against the force sensing module.

FIGS. 2A~2E show a first flexible circuit board based capacitor according to the present invention.

FIG. 2A shows that a flexible circuit board 410 has a top metal pad 431 and a bottom metal pad 432 which is physically independent from the top metal pad 431. A top terminal pad 41A electrically couples to the first metal pad 431. A right bottom terminal pad 41B is configured on bottom of the flexible circuit board 410. A left terminal pad 42 electrically couples to the second metal pad 432 and is configured side by side with reference to the right bottom terminal pad 41B.

FIG. 2B shows a side view of FIG. 2A. Only the metal pads 431, 432, top terminal pad 41A, and the left bottom terminal pad 42 are emphasized, circuits between the pads are omitted. The flexible circuit board 410 shall form a first capacitor C1 after being folded.

FIGS. 2C~2E shows the folding of the flexible circuit board 410. A first capacitor C1 has been formed. FIG. 2E shows the metal pads 431, 432 form a first capacitor C1. The top terminal pad 41A electrically couples to the right bottom terminal pad 41B after the flexible circuit board 410 is folded.

FIG. 2E shows that the first capacitor C1 is configured horizontally. The first capacitor C1 functions as a first force sensor according to the present invention.

FIGS. 3A~3E show a second flexible circuit board based capacitor according to the present invention.

FIG. 3A shows a front view of the second flexible circuit board 420 before being folded.

FIG. 3A shows that a flexible circuit board 420 has four metal pads 431,432,433,434. The top lower metal pad 431 is configured physically independent from the bottom higher metal pad 432. The top higher metal pad 433 is configured on top of the first metal pad 431 and electrically couples to the top lower metal pad 431. A bottom lower metal pad 434 is configured on bottom of the bottom higher metal pad 432 and electrically couples to the bottom higher metal pad 432. A top terminal pad 41A is configured on top and electrically couples to the top higher metal pad 433. A bottom right terminal pad 41B is configured on bottom of the flexible circuit board 420. A bottom left terminal pad 42 is configured side by side with reference to the bottom right terminal pad 41B on the same side of the flexible circuit board 420. The bottom left terminal pad 42 electrically couples to the bottom lower metal pad 434. The top terminal pad 41A is electrically coupled to the bottom right terminal pad 41B after the flexible circuit board 420 is folded.

FIG. 3B shows a side view of FIG. 3A. Only the metal pads 431, 432, 433, 434, top terminal pad 41A and bottom left terminal pad 42 are emphasized, circuits between pads are omitted. The flexible circuit board 420 forms a first capacitor C1 and a second capacitor C2 after it is folded.

FIGS. 3C~3E shows the folding of the flexible circuit board 420. FIG. 3D shows a first capacitor C1 and a second capacitor C2 are formed. The flexible circuit board 420 is folded so that the metal pads 431, 432 form a first capacitor C1 and the metal pads 433, 434 form a second capacitor C2.

FIG. 3E shows that the first capacitor C1 and the second capacitor C2 are further folded to stack with each other. The two capacitors C1, C2 function as two parallel connected force sensors according to the present invention.

FIGS. 4A~4E show a third flexible circuit board based capacitor according to the present invention.

FIG. 4A shows a front view of a third flexible circuit board 430 before being folded. The flexible circuit board 430 has six metal pads 431,432,433,434,435, and 436 formed thereon. The top lower metal pad 431 is configured physically independent from the bottom higher metal pad 432. The top middle metal pad 433 is configured on a top of the top lower metal pad 431 and electrically couples to the top lower metal pad 431. A bottom middle metal pad 434 is configured on bottom of the bottom higher metal pad 432 and electrically couples to the bottom higher metal pad 432. The top higher metal pad 435 is configured on a top of the top middle metal pad 433 and electrically couples to the top middle metal pad 433. A bottom lower metal pad 436 is configured on bottom of the bottom middle metal pad 434 and electrically couples to the bottom middle metal pad 434. A top terminal pad 41A is configured on top and electrically couples to the top higher metal pad 435. A bottom right terminal pad 41B is configured on bottom of the flexible circuit board 430. A bottom left terminal pad 42 is configured side by side with reference to the bottom right terminal pad 41B on the same side of the flexible circuit board 430. The bottom left terminal pad 42 electrically couples to the bottom lower metal pad 436. The top terminal pad 41A electrically couples to the bottom right terminal pad 41B after the flexible circuit board 430 is folded (FIG. 4D).

FIG. 4B shows a side view of FIG. 4A. The six metal pads 431, 432, 433, 434, 435, 436, top terminal pad 41A and bottom left pad 42 are emphasized. The flexible circuit board 430 forms a first capacitor C1, a second capacitor C2, and a third capacitor after the flexible circuit board 430 is folded (FIGS. 4D~4E).

FIGS. 4C~4E shows the folding of the flexible circuit board 430. The first capacitor C1, the second capacitor C2, and the third capacitor C3 are formed thereon as shown in FIG. 4D. The flexible circuit board 430 is folded so that the metal pads 431, 432 form a first capacitor C1. The metal pads 433, 434 form a second capacitor C2. The metal pads 435, 436 form a third capacitor C3.

FIG. 4E shows that the first capacitor C1, the second capacitor C2, and the third capacitor C3 are further folded to stack with one another. The three capacitors C1, C2, C3 function as three parallel connected force sensors according to the present invention.

FIGS. 5A~5C show a first embodiment of force sensing module according to the present invention.

FIG. 5A shows a first piece of piezo capacitive material 45 is inserted in between metal pads of the first capacitor C1 shown in FIG. 2E, a variable capacitor is formed. FIG. 5B shows a second piece of piezo capacitive material 45 is inserted in between metal pads of the two capacitors C1, C2 which are shown in FIG. 3E. FIG. 5C shows a third piece of piezo capacitive material 45 is inserted in between metal pads of the three capacitors C1, C2, C3 which are shown in FIG. 4E.

Piezo capacitive material is disclosed as an example, piezo-electric material, and piezo-resistive material also can be used to replace the piezo-capacitive material according to the present invention.

Figure 6B:
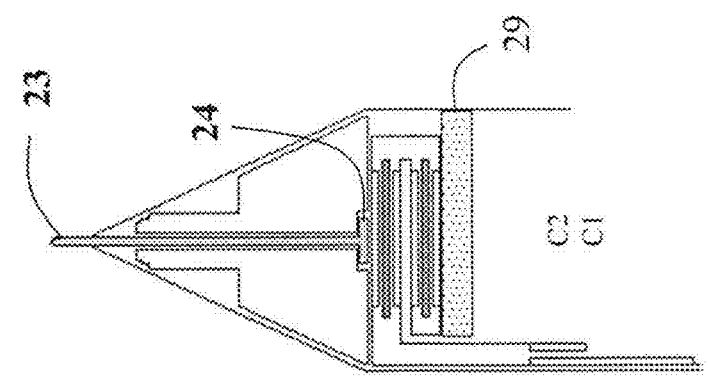
Figure 6C:
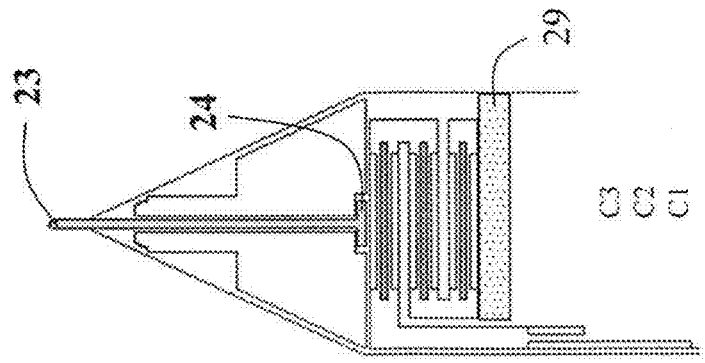

FIGS. 6A~6C show an electronic pen using the force sensing module according to the present invention.

FIG. 6A shows a holding block 29 is fixed in a shaft of a first electronic pen for holding the capacitor C1. FIG. 6B shows a holding block 29 is fixed in a shaft of a second electronic pen for holding the two capacitors C1, C2. FIG. 6C shows a holding block 29 is fixed in a shaft of a third electronic pen for holding the three capacitors C1, C2, C3 in a third electronic pen. A tip movement for the pen tip 23 according to the present invention is extremely tiny. Almost zero movement during drawing and writing of the pen tip is designed, because a bottom of the tip base 24 directly contacts the top surface of the first capacitor C1.

The tip based 24 of the electronic pen as disclosed in the present invention contacts but does not apply pressure to the underside capacitor. In other words, the underside capacitor is non-preloaded during standby period. There is no gap between the tip base 24 and underside capacitor. Such a design makes the electronic pen operate like an ordinary fountain pen or ball pen, there is no redundant press journey before the control system reacts to a writing or drawing action of the electronic pen. In other words, all press journey reflects the writing or drawing action to the control system according to the present invention.

Figure 7C:
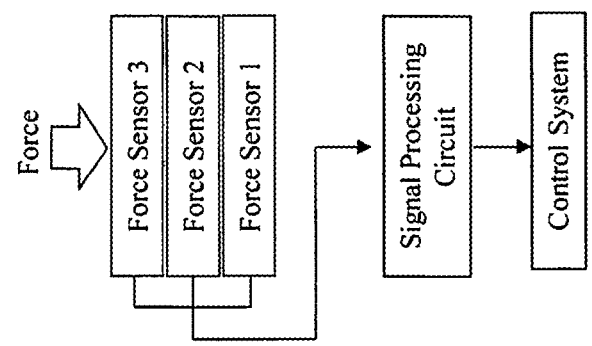
FIGS. 7A~7C show a force sensor arrangement according to the present invention.
Figure 7B:
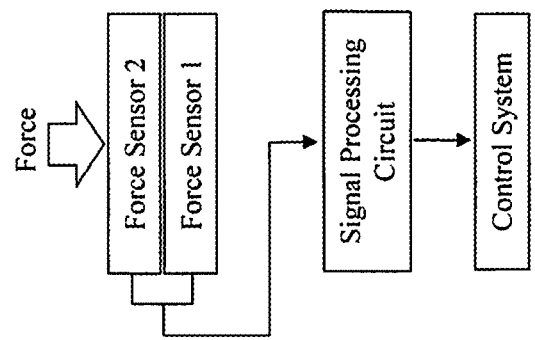
Figure 7A:
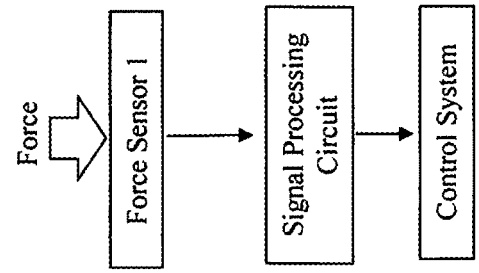

FIGS. 7A~7C show force sensor arrangement according to the present invention.

FIGS. 7A~7C shows block diagrams equivalent to the mechanism of the electronic pen shown in FIG. 6A~6C respectively.

FIG. 7A shows a single force sensor is designed in a force sensing module according to the present invention. A force sensor 1 electrically couples to a signal processing circuit for handling the sensing signal sensed at the force sensor 1. The signal processing circuit electrically couples to a control system.

FIG. 7B shows two force sensors are designed in a force sensing module according to the present invention. A force sensor 2 is stacked on a force sensor 1. The stacked force sensors electrically couples to a signal processing circuit for processing a signal sensed at the force sensor stack.

FIG. 7C shows three force sensors are designed in a force sensing module according to the present invention. A force sensor 3 is stacked on a force sensor 2 and the force sensor 2 is stacked on the force sensor 1. The stacked force sensors electrically couples to a signal processing circuit for processing a signal sensed at the force sensor stack.

Figure 8C:
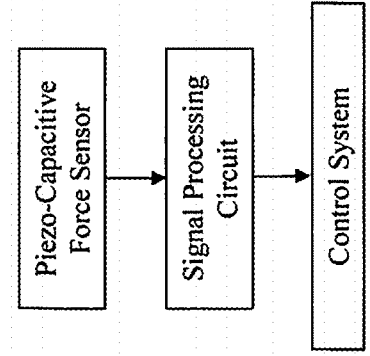
FIGS. 8A~8C show three types force sensor can be formed according to the present invention.
Figure 8B:
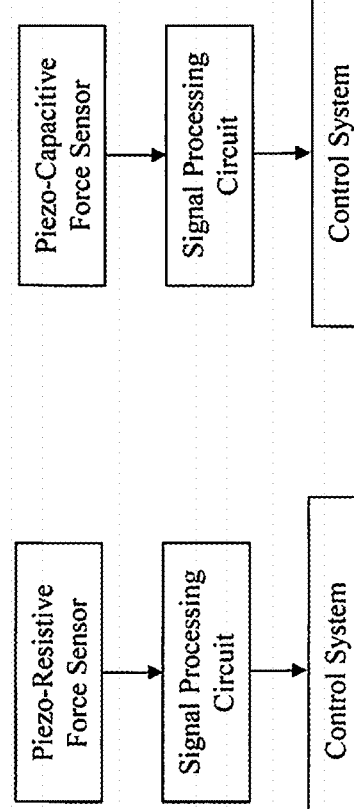
Figure 8A:
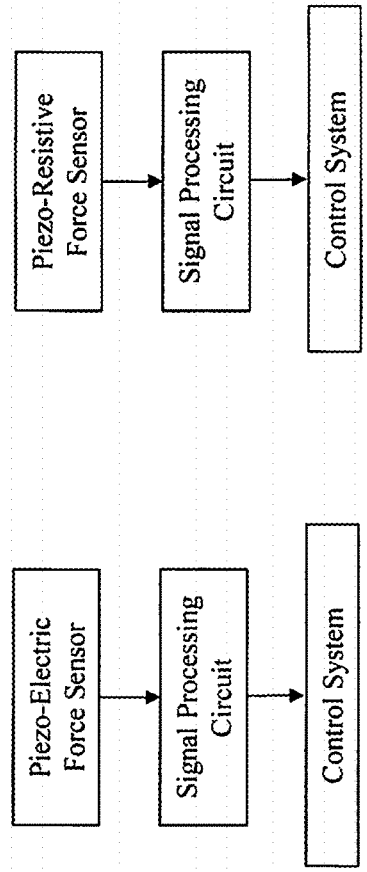

FIGS. 8A~8C show three types force sensor can be formed according to the present invention.

FIG. 8A shows piezo-electric type force sensor can be formed according to the present invention. While FIGS. 5A~5B shows piezo-capacitive layer is used. However, the piezo-capacitive layer can be replaced by piezo-electric material so that a piezo-electric force sensor is formed. FIG. 8A shows that the piezo-electric force sensor electrically couples to a signal processing circuit and the signal processing circuit electrically couples to a control system.

FIG. 8B shows piezo-resistive type force sensor can be formed according to the present invention. While FIGS. 5A~5B shows piezo-capacitive layer is used. However, the piezo-capacitive layer can be replaced by piezo-resistive material so that a piezo-resistive force sensor is formed. FIG. 8B shows that the piezo-resistive force sensor electrically couples to a signal processing circuit and the signal processing circuit electrically couples to a control system.

FIG. 8C shows that the piezo-capacitive force sensor shown in FIG. 6A~6C electrically couples to a signal processing circuit and the signal processing circuit electrically couples to a control system.

Figure 9C:
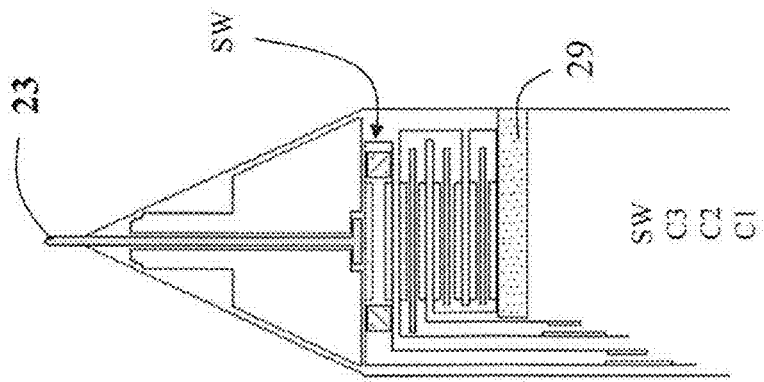
FIGS. 9A~9C show a second embodiment of the force sensing module according to the present invention.
Figure 9B:
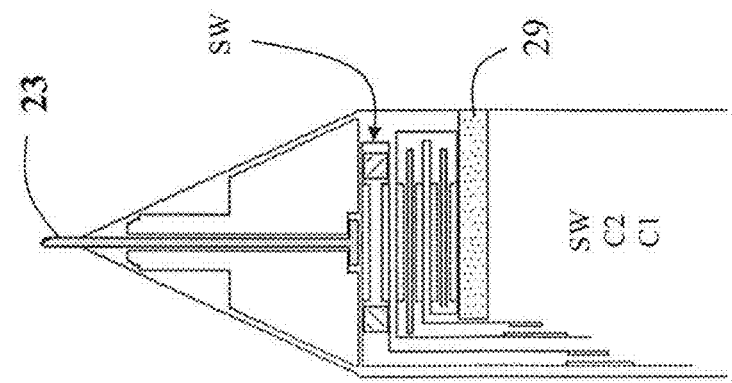
Figure 9A:
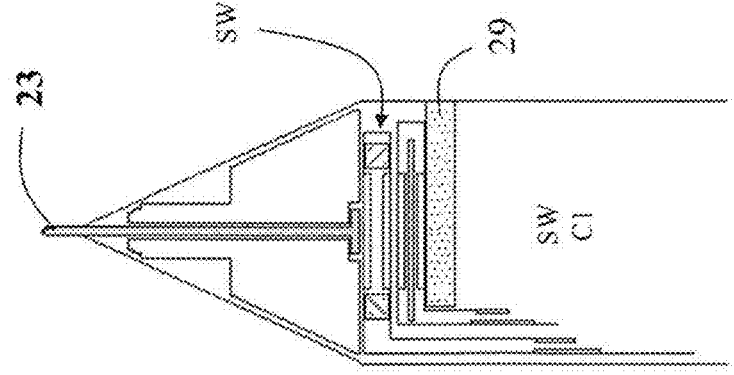

FIGS. 9A~9C show a second embodiment of the force sensing module according to the present invention.

As compared with the electronic pen of FIGS. 6A~6C, FIGS. 9A~9C disclosed a modified electronic pen, where a pressure switch is added to stack on top of the force sensor.

FIG. 9A shows a pressure switch SW is stacked on a top of the force sensor. A membrane switch is shown as an example to function as the pressure switch SW. A variable capacitor C1 is shown as an example to function as the force sensor.

FIG. 9B shows a pressure switch SW is stacked on a top of the two stacked force sensors. Two variable capacitors C1, C2 are shown as an example to function as the force sensor.

FIG. 9C shows a pressure switch SW is stacked on a top of the three stacked force sensors. Three variable capacitors C1, C2, C3 are shown as an example to function as the force sensor.

Figure 10C:
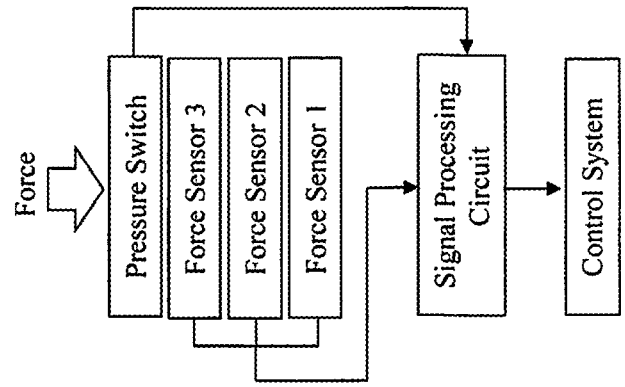
FIGS. 10A~10C show block diagrams equivalent to the mechanism of the electronic pen shown in FIGS. 9A~9C respectively.
Figure 10B:
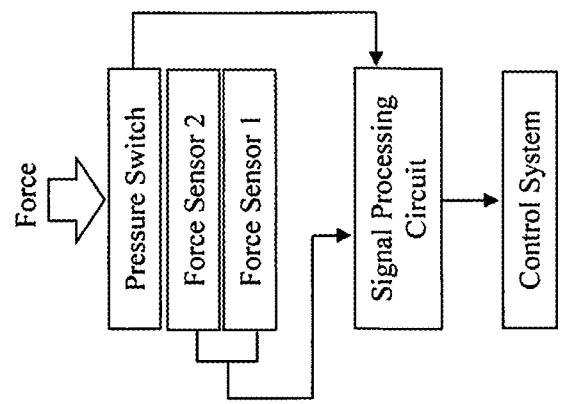
Figure 10A:
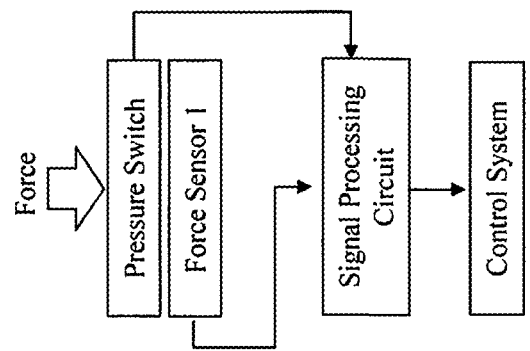

FIGS. 10A~10C show block diagrams equivalent to the mechanism of the electronic pen shown in FIGS. 9A~9C respectively.

FIG. 10A shows a pressure switch is stacked on a top of the force sensor 1. The pressure switch electrically couples to a signal processing circuit. The force sensor 1 electrically couples to the signal processing circuit. The signal processing circuit processes the signals coming from the pressure switch and the force sensor 1. The signal processing circuit electrically couples to a control system.

FIG. 10B shows a pressure switch is stacked on a top of the two stacked force sensors—force sensor 1, and force sensor 2. The pressure switch electrically couples to a signal processing circuit. The parallel connected force sensor 1 and force sensor 2 electrically couples to a signal processing circuit. The signal processing circuit electrically couples to a control system. The force sensor 1 and force sensor 2 can be serially connected (FIG. 11A) according to the present invention, the signal comes from either parallel connection or serial connection is processed in the signal processing circuit.

FIG. 10C shows a pressure switch is stacked on a top of the three stacked force sensors—force sensor 1, force sensor 2, and force sensor 3. The pressure switch electrically couples to a signal processing circuit. The parallel connected force sensor 1, force sensor 2 and force sensor 3 electrically couples to a signal processing circuit. The signal processing circuit electrically couples to a control system. The force sensor 1, force sensor 2, and force sensor 3 can be serially connected (FIG. 11B) according to the present invention, the signal comes from either parallel connection or serial connection is processed in the signal processing circuit.

FIGS. 11A~11B show modified block diagrams to FIGS. 10B~10C respectively.

FIG. 11A shows same blocks of FIG. 10B but with serial connection for the force sensor 1 and force sensor 2.

FIG. 11B shows same blocks of FIG. 10C but with serial connection for the force sensor 1, force sensor 2, and force sensor 3.

Figures 12A, 12B:
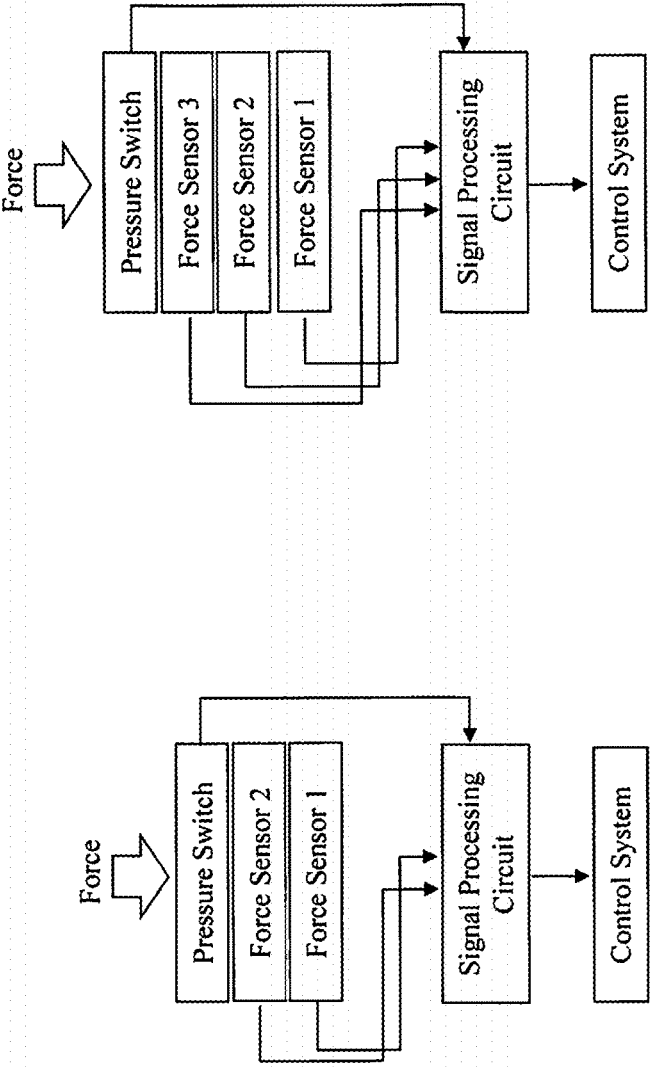
FIGS. 12A~12B show further modified block diagrams to FIG. 10B~10C respectively.

FIGS. 12A~12B show further modified block diagrams to FIG. 10B~10C respectively.

FIG. 12A shows same blocks of FIG. 10B but with force sensor 1 and force sensor 2 independently connected to the signal processing circuit. That is to say the force sensor 1 and the force sensor 2 can be discrete elements.

FIG. 12B shows same blocks of FIG. 10C but with the force sensor 1, force sensor 2, and force sensor 3 independently connected to the signal processing circuit. That is to say the force sensor 1, the force sensor 2, and the force sensor 3 can be discrete elements.

Figure 13A:
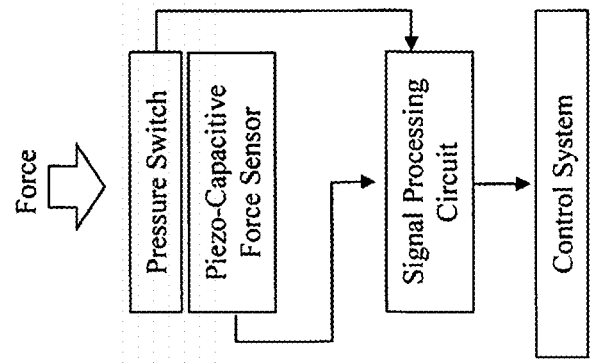
FIGS. 13A~13C show a modified force sensing module of FIGS. 8A~8C respectively according to the present invention.
Figure 13B:
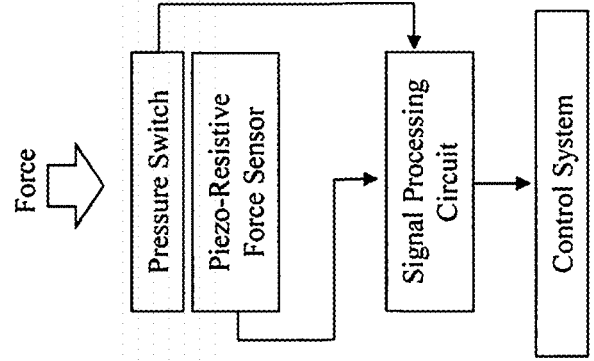
Figure 13C:
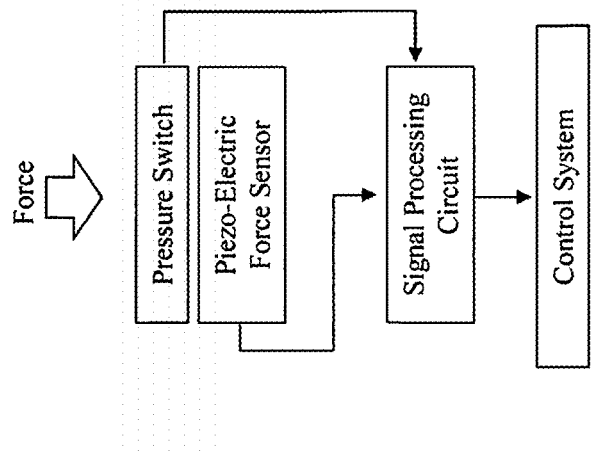

FIGS. 13A~13C show a modified force sensing module of FIGS. 8A~8C respectively according to the present invention.

As compared with FIGS. 8A~8C, a pressure switch is added in each of FIGS. 13A~13C.

FIG. 13A shows a pressure switch stacked on top of a piezo-electric force sensor. The pressure switch electrically couples to a signal processing circuit. The piezo-electric force sensor electrically couples to the signal processing circuit.

FIG. 13B shows a pressure switch stacked on top of a piezo-resistive force sensor. The pressure switch electrically couples to a signal processing circuit. The piezo-resistive force sensor electrically couples to the signal processing circuit.

FIG. 13C shows a pressure switch stacked on top of piezo-capacitive force sensor. The pressure switch electrically couples to a signal processing circuit. The piezo-capacitive force sensor electrically couples to the signal processing circuit.

Figure 14:
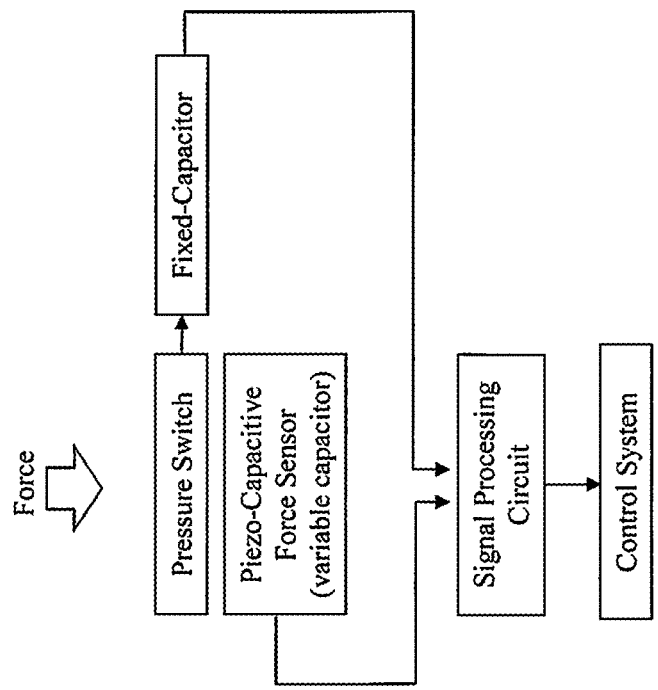
FIGS. 14~16 show a third embodiment of the force sensing module according to the present invention.
Figure 15:
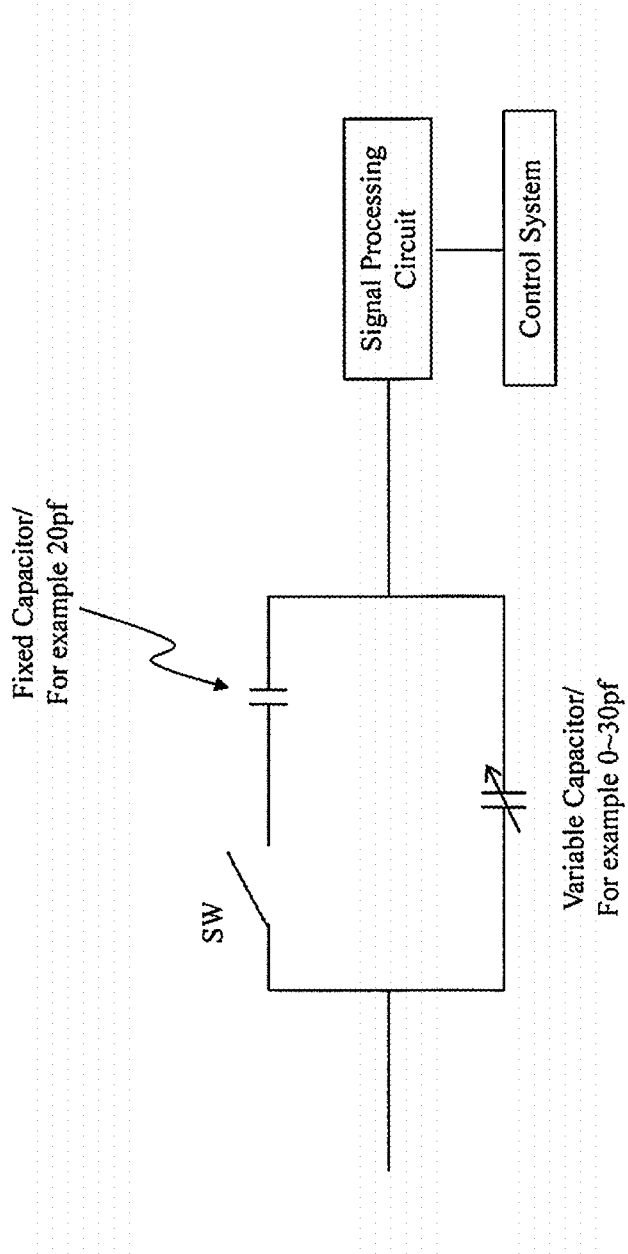
Figure 16:
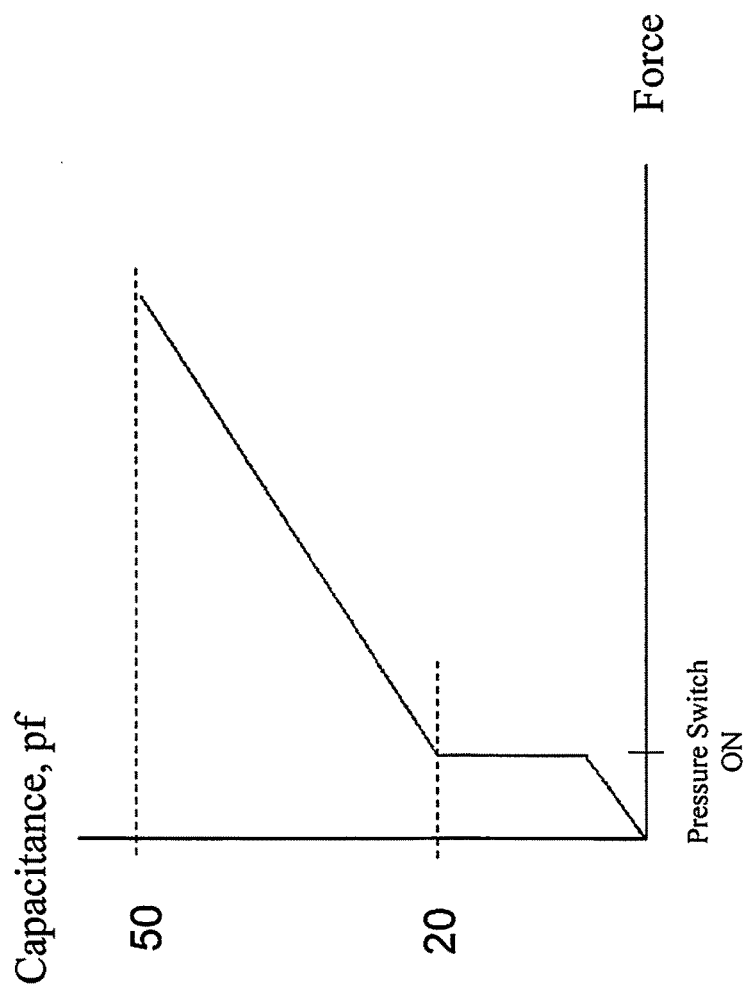

FIGS. 14~16 show a third embodiment of the force sensing module according to the present invention.

FIGS. 14~16 show a modified version of FIG. 13C. A fixed capacitor is added to serially connects to the pressure sensor, and electrically couples to the signal processing circuit. The piezo-capacitive force sensor functions as a variable capacitor and electrically couples to the signal processing circuit.

FIG. 15 shows an equivalent circuit corresponding to the structure of FIG. 14. A pressure switch SW is turned on when a pressure applies on top of the force sensing module reaches a predetermined threshold value. A fixed-capacitor, e.g. 20 pf, is connected with the pressure switch. A variable capacitor, e.g. C1, C2, C3 as described in the specification, and outputs 0~30 pf as an example. A signal processing circuit electrically couples the fixed capacitor and the variable capacitor. A control system electrically couples to the signal processing circuit.

FIG. 16 shows Capacitance v. Force for the embodiment of FIG. 15 according to the present invention. FIG. 16 shows the initial capacitance is 20 pf when the pressure switch turned on at a predetermined value. The capacitance value is then positively related to the magnitude of the variable capacitor. The magnitude of the variable capacitor is positively related to the force applies against the fore sensing module.

Figure 17B:
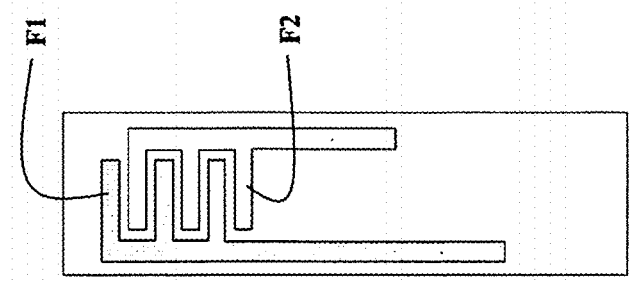
Figure 17A:
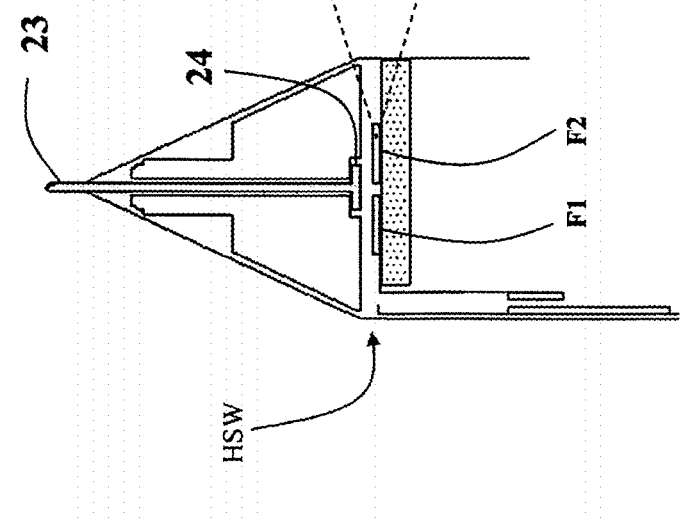

FIGS. 17A~17B shows a modified version of the pressure switch according to the present invention.

A half switch can be one of the design choices according to the present invention. FIG. 17A shows a half pressure switch HSW is configured on a bottom of the tip base 24. When the tip base 24 is made of metal, conductive rubber, or conductive plastic, a half switch HSW can be configured on bottom of the tip base 24. FIG. 17B shows the half switch HSW comprises a first metal finger F1 and second metal finger F2 interdigitally configured. The first metal finger F1 is electrically independent from the second metal finger F2. The first metal finger F1 electrically coupes to a first electrode, and the second metal finger F2 electrically coupes to a second electrode. When the tip base 24 contacts both first metal finger F1 and the second metal finger F2, the switch is turned on.

While several embodiments have been described by way of example, it will be apparent to those skilled in the art that various modifications may be configured without departs from the spirit of the present invention. Such modifications are all within the scope of the present invention, as defined by the appended claims.

What is claimed is:
1. A force sensing module, comprising:
   a sensor stack comprising:
      a first force sensor; and
      a second force sensor stacked on a top surface of the first force sensor; and a signal processing circuit electrically coupled to the first force sensor and the second force sensor;
wherein
the sensor stack is configured to, in response to a force applied on a top surface of the sensor stack, generate a force signal,
a strength of the force signal corresponds to an amount of the force applied against the sensor stack,
the force sensing module further comprises a flexible circuit board having thereon first to fourth metal pads, on the flexible circuit board,
  the first and second metal pads are arranged between the third and fourth metal pads,
  the first and third metal pads are arranged on one side of a first folding line, and
  the second and fourth metal pads are arranged on an opposite side of the first folding line, and
  the flexible circuit board is in a folded state in which
    the flexible circuit board is folded along the first folding line to align the first and second metal pads with each other to form the first force sensor, and align the third and fourth metal pads with each other to form the second force sensor, and
    the flexible circuit board is further folded along a second folding line between the first and third metal pads and also between the second and fourth metal pads to arrange the first and second metal pads below the third and fourth metal pads.

2. A force sensing module as claimed in claim 1, wherein the sensor stack further comprises:
a third force sensor stacked on a top surface of the second force sensor,
the signal processing circuit is electrically coupled to the third force sensor,
the flexible circuit board further has thereon a fifth metal pad and a sixth metal pad, on the flexible circuit board,
the first to fourth metal pads are arranged between the fifth and sixth metal pads,
the first, third and fifth metal pads are arranged on said one side of the first folding line, and
the second, fourth and sixth metal pads are arranged on said opposite side of the first folding line, and
in the folded state of the flexible circuit board,
the flexible circuit board is folded along the first folding line to align the fifth and sixth metal pads with each other to form the third force sensor, and
the flexible circuit board is further folded along a third folding line between the fifth and third metal pads and also between the sixth and fourth metal pads to arrange the fifth and sixth metal pads above the third and fourth metal pads.

3. A force sensing module as claimed in claim 1, wherein the first force sensor and the second sensor are parallel connected.

4. A force sensing module as claimed in claim 1, wherein the first force sensor and the second sensor are serial connected.

5. A force sensing module as claimed in claim 1, wherein each of the first force sensor and the second force sensor is selected from the group consisting of a piezo-electric force sensor, a piezo-resistive force sensor, and a piezo-capacitive force sensor.

6. A force sensing module as claimed in claim 1, further comprising:
a pressure switch stacked on the top surface of the sensor stack;
wherein the signal processing circuit is electrically coupled to the pressure switch, and
the pressure switch is configured to turn on when the force reaches a predetermined threshold force.

7. A force sensing module as claimed in claim 6, wherein the pressure switch is a half switch configured to be activated by an external electrical conductive element selected from the group consisting of metal, conductive rubber, and conductive plastic.

8. An electronic pen, comprising:
a pen tip;
a tip base configured on bottom of the pen tip; and
a stack configured on bottom of the tip base, the stack comprising a first force sensor;
wherein
the stack is configured to, in response to a force applied against a top surface of the stack from the tip base, generate a force signal,
a strength of the force signal corresponds to an amount of the force applied against the stack,
the stack further comprises a flexible circuit board having thereon
  first and second metal pads,
  first and second terminals,
  a first conductor connecting the first metal pad and the first terminal, and
  a second conductor connecting the second metal pad and the second terminal, on the flexible circuit board,
  the first conductor, the first metal pad and the first terminal are arranged on one side of a first folding line, and
  the second conductor, the second metal pad and the second terminal are arranged on an opposite side of the first folding line, and
the flexible circuit board is in a folded state in which the flexible circuit board is folded along the first folding line to align the first and second metal pads with each other to form the first force sensor.

9. An electronic pen as claimed in claim 8, wherein the stack further comprises:
a second force sensor stacked on a top surface of the first force sensor,
the flexible circuit board further has thereon a third metal pad and a fourth metal pad, on the flexible circuit board,
the first and second metal pads are arranged between the third and fourth metal pads,
the first and third metal pads are arranged on said one side of the first folding line, and
the second and fourth metal pads are arranged on said opposite side of the first folding line, and
in the folded state of the flexible circuit board,
the flexible circuit board is folded along the first folding line to align the third and fourth metal pads with each other to form the second force sensor, and
the flexible circuit board is further folded along a second folding line between the first and third metal pads and also between the second and fourth metal pads to arrange the first and second metal pads below the third and fourth metal pads.

10. An electronic pen as claimed in claim 9, wherein the stack further comprises:
a third force sensor stacked on a top surface of the second force sensor,
the flexible circuit board further has thereon a fifth metal pad and a sixth metal pad, on the flexible circuit board,
the first to fourth metal pads are arranged between the fifth and sixth metal pads, the first, third and fifth metal pads are arranged on said one side of the first folding line, and the second, fourth and sixth metal pads are arranged on said opposite side of the first folding line, and in the folded state of the flexible circuit board, the flexible circuit board is folded along the first folding line to align the fifth and sixth metal pads with each other to form the third force sensor, and the flexible circuit board is further folded along a third folding line between the fifth and third metal pads and also between the sixth and fourth metal pads to arrange the fifth and sixth metal pads above the third and fourth metal pads.

11. An electronic pen as claimed in claim 10, wherein, when no force is applied to the pen tip in a direction toward the stack, the tip base directly contacts but does not apply pressure to the stack.

12. An electronic pen as claimed in claim 10, wherein the first force sensor, the second force sensor, and the third force sensor are non-preloaded during a standby period.

13. An electronic pen as claimed in claim 10, wherein each of the first force sensor, the second force sensor and the third force sensor is selected from the group consisting of a piezo-electric force sensor, a piezo-capacitive force sensor, and a piezo-resistive force sensor.

14. An electronic pen as claimed in claim 10, wherein on the flexible circuit board, the first conductor and the first terminal are arranged on one side of a center line that is perpendicular to the first folding line and extends along a lengthwise direction of the flexible circuit board, and the second conductor and the second terminal are arranged on an opposite side of the center line.

15. An electronic pen as claimed in claim 14, wherein the third force sensor further comprises a third piece of piezo-material configured between the fifth metal pad and the sixth metal pad, and the piezo-material is selected from the group consisting of piezo-electric material, piezo-capacitive material, and piezo-resistive material.

16. An electronic pen as claimed in claim 10, wherein the stack further comprises a pressure switch stacked on a top surface of the third force sensor, wherein the pressure switch is configured to turn on when the force reaches a predetermined threshold force.

17. An electronic pen as claimed in claim 16, wherein, when no force is applied to the pen tip in a direction toward the stack, the tip base directly contacts but does not apply pressure to the stack.

18. An electronic pen as claimed in claim 16, wherein the first force sensor, the second force sensor, and the third force sensor are non-preloaded during a standby period.

19. An electronic pen as claimed in claim 16, wherein each of the first force sensor, the second force sensor and the third force sensor is selected from the group consisting of a piezo-electric force sensor, a piezo-capacitive force sensor, and a piezo-resistive force sensor.

20. An electronic pen as claimed in claim 10, wherein the flexible circuit board further has thereon a terminal portion at an end of the flexible circuit board where the second terminal is arranged, on the flexible circuit board, the first conductor, the first terminal and the terminal portion are arranged on one side of a center line that is perpendicular to the first folding line and extends along a lengthwise direction of the flexible circuit board, and the second conductor and the second terminal are arranged on an opposite side of the center line, and in the folded state of the flexible circuit board, the first terminal overlaps the terminal portion and is electrically coupled to the terminal portion.

21. An electronic pen as claimed in claim 20, wherein the third force sensor further comprises a third piece of piezo-material configured between the fifth metal pad and the sixth metal pad, and the piezo-material is selected from the group consisting of piezo-electric material, piezo-capacitive material, and piezo-resistive material.

22. An electronic pen as claimed in claim 9, wherein, when no force is applied to the pen tip in a direction toward the stack, the tip base directly contacts but does not apply pressure to the stack.

23. An electronic pen as claimed in claim 9, wherein the first force sensor and the second force sensor are non-preloaded during a standby period.

24. An electronic pen as claimed in claim 9, wherein each of the first force sensor and the second force sensor is selected from the group consisting of a piezo-electric force sensor, a piezo-capacitive force sensor, and a piezo-resistive force sensor.

25. An electronic pen as claimed in claim 9, wherein on the flexible circuit board, the first conductor and the first terminal are arranged on one side of a center line that is perpendicular to the first folding line and extends along a lengthwise direction of the flexible circuit board, and the second conductor and the second terminal are arranged on an opposite side of the center line.

26. An electronic pen as claimed in claim 25, wherein the second force sensor further comprises a second piece of piezo-material configured between the third metal pad and the fourth metal pad, and the piezo-material is selected from the group consisting of piezo-electric material, piezo-capacitive material, and piezo-resistive material.

27. An electronic pen as claimed in claim 9, wherein the stack further comprises a pressure switch stacked on a top surface of the second force sensor, wherein the pressure switch is configured to turn on when the force reaches a predetermined threshold force.

28. An electronic pen as claimed in claim 27, wherein, when no force is applied to the pen tip in a direction toward the stack, the tip base directly contacts but does not apply pressure to the stack.

29. An electronic pen as claimed in claim 27, wherein the first force sensor and the second force sensor are non-preloaded during a standby period.

30. An electronic pen as claimed in claim 27, wherein each of the first force sensor and the second force sensor is selected from the group consisting of a piezo-electric force sensor, a piezo-capacitive force sensor, and a piezo-resistive force sensor.

31. An electronic pen as claimed in claim 9, wherein the flexible circuit board further has thereon a terminal portion at an end of the flexible circuit board where the second terminal is arranged, on the flexible circuit board, the first conductor, the first terminal and the terminal portion are arranged on one side of a center line that is perpendicular to the first folding line and extends along a lengthwise direction of the flexible circuit board, and the second conductor and the second terminal are arranged on an opposite side of the center line, and in the folded state of the flexible circuit board, the first terminal overlaps the terminal portion and is electrically coupled to the terminal portion.

32. An electronic pen as claimed in claim 31, wherein
the second force sensor further comprises a second piece of piezo-material configured between the third metal pad and the fourth metal pad, and
the piezo-material is selected from the group consisting of piezo-electric material, piezo-capacitive material, and piezo-resistive material.

33. An electronic pen as claimed in claim 8, wherein, when no force is applied to the pen tip in a direction toward the stack, the tip base directly contacts but does not apply pressure to the stack.

34. An electronic pen as claimed in claim 8, wherein the first force sensor is non-preloaded during a standby period.

35. An electronic pen as claimed in claim 8, wherein
the first force sensor is selected from the group consisting of a piezo-electric force sensor, a piezo-capacitive force sensor, and a piezo-resistive force sensor.

36. An electronic pen as claimed in claim 8, wherein on the flexible circuit board,
the first conductor and the first terminal are arranged on one side of a center line that is perpendicular to the first folding line and extends along a lengthwise direction of the flexible circuit board, and
the second conductor and the second terminal are arranged on an opposite side of the center line.

37. An electronic pen as claimed in claim 36, wherein
the first force sensor further comprises a first piece of piezo-material configured between the first metal pad and the second metal pad, and
the piezo-material is selected from the group consisting of piezo-electric material, piezo-capacitive material, and piezo-resistive material.

38. An electronic pen as claimed in claim 8, wherein
the stack further comprises a pressure switch stacked on a top surface of the first force sensor,
wherein the pressure switch is configured to turn on when the force reaches a predetermined threshold force.

39. An electronic pen as claimed in claim 38, wherein, when no force is applied to the pen tip in a direction toward the stack, the tip base directly contacts but does not apply pressure to the stack.

40. An electronic pen as claimed in claim 38, wherein the first force sensor is non-preloaded during a standby period.

41. An electronic pen as claimed in claim 38, wherein
the first force sensor is selected from the group consisting of a piezo-electric force sensor, a piezo-capacitive force sensor, and a piezo-resistive force sensor.

42. An electronic pen as claimed in claim 8, wherein the flexible circuit board further has thereon a terminal portion at an end of the flexible circuit board where the second terminal is arranged, on the flexible circuit board,
the first conductor, the first terminal and the terminal portion are arranged on one side of a center line that is perpendicular to the first folding line and extends along a lengthwise direction of the flexible circuit board, and
the second conductor and the second terminal are arranged on an opposite side of the center line, and
in the folded state of the flexible circuit board, the first terminal overlaps the terminal portion and is electrically coupled to the terminal portion.

43. An electronic pen as claimed in claim 42, wherein
the first force sensor further comprises a first piece of piezo-material configured between the first metal pad and the second metal pad, and
the piezo-material is selected from the group consisting of piezo-electric material, piezo-capacitive material, and piezo-resistive material.

44. An electronic pen, comprising:
a pen tip;
a tip base configured on bottom of the pen tip;
a stack comprising:
    a piezo-capacitive force sensor configured as a variable capacitor; and
    a pressure switch stacked on a top surface of the piezo-capacitive force sensor;
a fixed capacitor serially connected with the pressure switch;
a signal processing circuit electrically coupled to the piezo-capacitive force sensor and electrically coupled to the fixed capacitor;
wherein
the stack is configured to, in response to a force applied from the tip base on a top surface of the pressure switch, generate a force signal,
a strength of the force signal corresponds to an amount of the force applied against the stack,
the stack further comprises a flexible circuit board having thereon first to fourth metal pads,
on the flexible circuit board,
    the first and second metal pads are arranged between the third and fourth metal pads,
    the first and third metal pads are arranged on one side of a first folding line, and
    the second and fourth metal pads are arranged on an opposite side of the first folding line, and
the flexible circuit board is in a folded state in which
    the flexible circuit board is folded along the first folding line to align the first and second metal pads with each other to form the first force sensor, and align the third and fourth metal pads with each other to form the second force sensor, and
    the flexible circuit board is further folded along a second folding line between the first and third metal pads and also between the second and fourth metal pads to arrange the first and second metal pads below the third and fourth metal pads.

45. An electronic pen as claimed in claim 44, wherein the variable capacitor is coupled in parallel to a circuit in which the fixed capacitor is serially connected with the pressure switch.

46. An electronic pen as claimed in claim 45, wherein the pressure switch is a half switch configured to be activated by an external electrical conductive element selected from the group consisting of metal, conductive rubber, and conductive plastic.

* * * * *